(12) United States Patent
Rosemeier et al.

(10) Patent No.: US 12,687,452 B2
(45) Date of Patent: Jul. 21, 2026

(54) DEVICE AND METHOD FOR CLAMPING A TEST PIECE

(71) Applicant: Fraunhofer-Gesellschaft zur Förderung der angewandten Forschung e.V., Munich (DE)

(72) Inventors: Malo Rosemeier, Bremerhaven (DE); Alexandros Antoniou, Bremerhaven (DE); Thomas Gebauer, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 477 days.

(21) Appl. No.: 18/249,040

(22) PCT Filed: Oct. 8, 2021

(86) PCT No.: PCT/EP2021/077936
§ 371 (c)(1),
(2) Date: Apr. 13, 2023

(87) PCT Pub. No.: WO2022/078911
PCT Pub. Date: Apr. 21, 2022

(65) Prior Publication Data
US 2023/0393020 A1 Dec. 7, 2023

(30) Foreign Application Priority Data
Oct. 14, 2020 (DE) .................... 10 2020 127 065.8

(51) Int. Cl.
*G01M 5/00* (2006.01)

(52) U.S. Cl.
CPC .......... *G01M 5/005* (2013.01); *G01M 5/0016* (2013.01)

(58) Field of Classification Search
CPC .. G01M 5/005; G01M 5/0016; G01M 5/0075; G01M 99/007; G01M 7/027;
(Continued)

(56) References Cited

U.S. PATENT DOCUMENTS

| | | | |
|---|---|---|---|
| 5,054,324 A * | 10/1991 | Pohl | ......................... G01N 3/04 73/859 |
| 7,168,898 B2 * | 1/2007 | Hamann | ................ B23Q 1/035 409/199 |

(Continued)

FOREIGN PATENT DOCUMENTS

| | | |
|---|---|---|
| JP | 06109609 A | 4/1994 |
| JP | 2014098664 A | 5/2014 |

OTHER PUBLICATIONS

Chuck (in mechanical engineering and manufacture). (2001). In R. L. Timings & P. Twigg, Dictionary of Engineering Terms, Butterworth-Heinemann (1st ed.). Routledge. https://search. credoreference.com/articles/Qm9va0FydGljbGU6MTQzNzgzNw==? aid=279753 (Year: 2001).*

(Continued)

*Primary Examiner* — Huy Q Phan
*Assistant Examiner* — Martin Walter Braunlich
(74) *Attorney, Agent, or Firm* — Nelson Mullins Riley & Scarborough LLP

(57) ABSTRACT

The invention relates to a device for clamping a test piece (1, 1', 1"), comprising an upper clamping rail (3U) and a lower clamping rail (3L) for horizontally clamping an upper end and a lower end of the test piece (1, 1', 1"). In addition, it comprises vertical left clamping edges (4L, 4L') and vertical right clamping edges (4R, 4R') for laterally supporting a right side and a left side of the test piece (1, 1', 1"). A segmented bearing, in each case comprising a plurality of pivotably movable bearing segments (26), which can be individually pivoted out of a clamping plane, is arranged on
(Continued)

Figure 1:
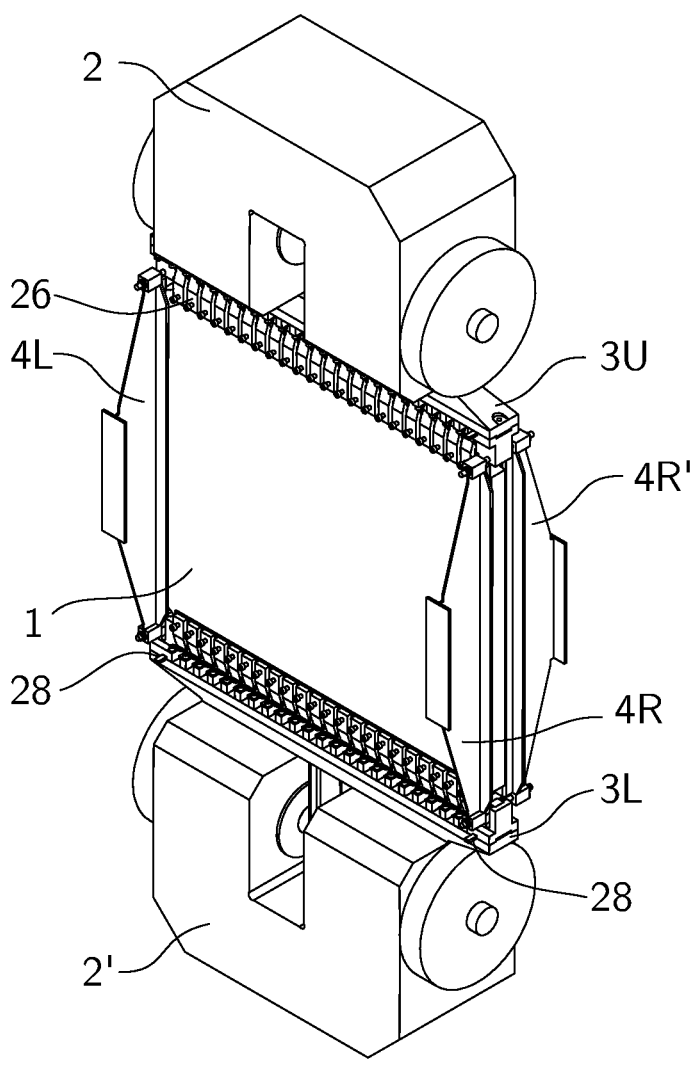

each of the upper clamping rail (3U) and the lower clamping rail (3L). The bearing segments (26) each comprise a bearing segment chuck. The invention also relates to a method for clamping a test piece (1, 1', 1") and to a system for buckling testing.

20 Claims, 7 Drawing Sheets

(58) Field of Classification Search
CPC ......... G01M 13/027; G01N 3/08; G01N 3/04; G01N 3/32; G01N 3/40; G01N 2203/0405; G01N 3/12; G01N 2203/0246; G01N 2203/0254; G01N 2203/0435; G05B 2219/35314
See application file for complete search history.

(56) References Cited

U.S. PATENT DOCUMENTS

| | | | | |
|---|---|---|---|---|
| 8,110,054 | B2 * | 2/2012 | Litzenberger | B23K 26/26 |
| | | | | 156/304.3 |
| 8,365,610 | B2 * | 2/2013 | Decraecker | G01M 13/027 |
| | | | | 73/837 |
| 9,103,751 | B2 * | 8/2015 | Negro | G01N 3/20 |
| 9,810,612 | B2 * | 11/2017 | Meriaux | G01N 3/02 |

| | | | | |
|---|---|---|---|---|
| 2005/0222488 | A1 | 10/2005 | Chang et al. | |
| 2005/0224655 | A1 * | 10/2005 | Guittard | F16B 5/04 |
| | | | | 29/525 |
| 2007/0203391 | A1 | 8/2007 | Bloom et al. | |
| 2010/0313670 | A1 | 12/2010 | Decraecker | |
| 2014/0352451 | A1 | 12/2014 | Kismarton | |
| 2016/0377517 | A1 | 12/2016 | Taba et al. | |
| 2017/0086975 | A1 | 3/2017 | Gilmore et al. | |
| 2019/0365539 | A1 | 12/2019 | Rabito et al. | |
| 2019/0380699 | A1 | 12/2019 | Bak-Boychuk et al. | |

OTHER PUBLICATIONS

Lelikov, O.P. (2009). Design of Machine Elements. In: Grote, KH., Antonsson, E. (eds) Springer Handbook of Mechanical Engineering. Springer Handbooks. Springer, Berlin, Heidelberg. https://doi.org/10.1007/978-3-540-30738-9_6 (Year: 2009).*

Crump, D A, J M Dulieu-Barton, and J Savage. "Design and Commission of an Experimental Test Rig to Apply a Full-Scale Pressure Load on Composite Sandwich Panels Representative of an Aircraft Secondary Structure." Measurement science & technology 21.1 (2010): 015108-015108 (16). Web. (Year: 2010).*

Office Action issued in German Application No. 10 2020 127 065.8, dated Jun. 25, 2021.

International Search Report and Written Opinion issued in PCT/EP2021/077936, issued Feb. 2, 2022.

* cited by examiner

DEVICE AND METHOD FOR CLAMPING A TEST PIECE

The invention relates to a device and to a method for clamping a test piece. Particularly advantageously, the invention can be used for clamping a planar test piece which has a thickness that is significantly lower than its width and height.

In order to minimize power generation costs (levelized cost of energy (LCoE)) for wind energy, on one hand, rotor blades of wind turbines should be configured to be as light as possible while still having sufficient stability and strength, and, on the other hand, should have a high level of reliability, i.e. a low likelihood of failure.

Calculation models having both low and high levels of detail are available for the structural configuration of thin-walled structures, as are found in rotor blades. For a simplified view of a thin-walled, curved shell, a plate model or a sandwich model is usually used. For the problem of stability (buckling) of the plate or sandwich, there are analytical solutions for all-around articulated support (simple support (SS)) on one hand and for all-around torsionally rigid support (clamped support (CS)) on the other hand. In addition, numerical solutions can be produced for different boundary conditions, for example by means of finite element methods.

So that rigidity and resistance, for example, of thin-walled structures, such as plates or sandwiches, can be reliably calculated, the numerical methods and the models used therein need to be sufficiently validated and the model quality thereof ascertained. The model quality of the models used for the configuration is thus linked to the power generation costs. For example, the potential for saving material, for example in core materials of the sandwiches, can be ascertained. The core materials are, on one hand, usually relatively thick compared with the skins of the sandwiches and, on the other hand, absorb a lot of resin through the slots therein. This therefore has the potential for saving material, for example.

The problem addressed by the invention is therefore to make it possible to validate models by experimentation.

This problem is solved by a device and by a method having the features of the independent claims. Advantageous developments will become apparent from the dependent claims as well as the following description and the drawings.

Accordingly, the device for clamping a test piece has an upper clamping rail for horizontally clamping an upper end of the test piece and a lower clamping rail for horizontally clamping a lower end of the test piece. Furthermore, it comprises vertical left clamping edges and vertical right clamping edges for laterally supporting a right side and a left side of the test piece. A segmented bearing, in each case comprising a plurality of pivotably movable bearing segments, which can be individually pivoted out of a clamping plane, is arranged on each of the upper clamping rail and the lower clamping rail. The bearing segments each comprise a bearing segment chuck.

The method for clamping a test piece comprises at least the steps of:

clamping a lower clamping rail to a lower machine chuck of a lower clamping head of a test bench, clamping an upper clamping rail to an upper machine chuck of an upper clamping head of the test bench, fastening bearing segments to the upper clamping rail and the lower clamping rail, fastening rear lateral clamping edges to the upper clamping rail, inserting the test piece and clamping the test piece in the bearing segments of the lower clamping rail by means of lower bearing segment chucks, fastening front lateral clamping edges to the upper clamping rail such that the test piece is arranged between the front and the rear clamping edges, lowering the upper clamping head while inserting a groove-pin system for movably fastening the clamping edges to the lower clamping rail.

The steps can in particular be performed in the order set out here.

The method can in particular be carried out using the test bench according to the invention.

The invention, i.e. in particular the device and/or the method, can for example be used when testing, in particular when buckling testing, planar test pieces, such as plates or sandwich components that have a thickness that is significantly lower than their width and height, i.e., for example, at least one order of magnitude lower, in particular between one and two or between one and three orders of magnitude lower. Particularly advantageously, it can be used when testing wind turbine blades. For example, components of a wind turbine blade, a rotor blade, a tidal power plant, a water flow turbine, or aircraft wings can be tested, which are clamped in the device or clamped by means of the method.

The invention can, for example, make it possible to reduce buckling resistance of the test piece and/or make it possible to advantageously describe relevant types of failure, such as core shear buckling.

The device can be configured such that the test piece, i.e. in particular the plate or sandwich, can twist along its edges according to its deflection. As a result, the device can, for example, prevent failure at the clamped edges.

The upper and the lower clamping rail can allow the test piece to be horizontally clamped. The vertical clamping edges to the left and right are, for example, configured such that they allow for vertical guidance, which in particular constitutes movable support. In a possible configuration, two vertical left clamping edges, namely one front and one rear left clamping edge, and two vertical right clamping edges, namely one front and one rear right clamping edge, provide the vertical support of the right and the left side. The test piece sits between the front and the rear clamping edge, with clearance being provided such that the test piece, i.e., for example, the plate or sandwich, is movable between the front and rear clamping edge. For example, a gap remains between the clamping edges and the plate to allow for this type of movability. Overall, quasi-all-around articulated support ("simple support") can thus be obtained. Advantageously, friction at the horizontal clamping can be minimized in this way. In these examples, the plate can therefore e.g. expand laterally without being prevented from doing so by the lateral support. The vertical clamping preferably also tolerates this kind of expansion. This quasi-all-around articulated support is therefore in contrast to torsionally rigid support ("clamped support"), in which, for example, edges of a test piece are clamped in a torsionally rigid manner.

The device or the method can therefore allow for clamping such that it is possible for there to be deformation of the test piece, during which the test piece becomes wider. On one hand, it can expand to the right and the left between the clamping edges, for example. On the other hand, the bearing segment chucks can allow for such deformation. For example, the horizontal clamping in the bearing segment chuck can be configured such that the test piece can slide and/or become wider therein. This can be brought about by pressure acting on the test piece, in particular on its front face and rear face, due to the clamping of the bearing segment chuck not exceeding a predetermined or permissible pressure. As a result, undesired damage to the test piece can also be prevented or reduced by the bearing segment chuck, for example.

Alternatively or additionally, the bearing segments can have a coating for reducing a coefficient of friction, for example made of polytetrafluorethylene, polyoxymethylene, or an alloy, at the contact surfaces at which they contact edges of the test piece. In one example, a coefficient of friction $\mu$ of at most 0.08, preferably at most 0.06, and/or at least 0.02 or at least 0.03, is set. For example, $\mu$=0.05. A load is applied to the test piece by way of these contact surfaces, for example, when it is exposed to compressive stress.

The bearing segment chucks can comprise clamping screws and/or clamping plates, for example. In this case, for example, a pair of opposing clamping screws are arranged in each bearing segment. In the method, the clamping screws are preferably tightened to a form fit such that there is no clearance but there is also no pressure exerted on the test piece, i.e. on its front face and rear face, due to the clamping screws being tightened. In one example, the clamping screws can be tightened manually during the clamping.

The bearing segment chucks can be configured to receive test pieces having different thicknesses. For example, they can also be configured to receive test pieces having spatially varying thicknesses, i.e. in particular test pieces of which the thickness along the upper and/or lower end clamped in the bearing segment chuck is not constant.

For example, the device allows for "simple support" of comparatively thick plates or sandwiches, in particular having thicknesses of greater than 30 mm, greater than 40 mm, or greater than 50 mm. For example, test pieces having thicknesses of at least 1 mm or at least 10 mm or at least 20 mm can be received in the bearing segment chucks. For example, test pieces having thicknesses of at most 100 mm or at most 60 mm or at most 55 mm can be received in the bearing segment chucks.

In one example, the bearing segment chucks can allow for alignment of the test piece relative to a pivot axis of the bearing segments, on the upper and/or the lower clamping rail. The pivot axis is typically a bearing axis defined by the bearing segments.

The bearing segments can comprise journals which specify the pivot axis around which the segments are pivotable out of the clamping plane, in particular individually pivotable, such that it is also possible to deform the test piece.

In the method, the test piece can first be inserted into and clamped in the lower bearing segment chuck, and the lower bearings can be pivoted forward in preparation in order to allow the test piece to be inserted in a flat manner.

Subsequently, the test piece can be pivoted upward and then the upper clamping rail can be lowered. As a result, the number of persons required for carrying out the method can be reduced.

In the method, the test piece is clamped to the bearing segment chucks of the upper clamping rail. This is carried out, for example, once the groove-pin system for supporting the clamping edges has been inserted and the upper clamping rail has been lowered onto the test piece. As a result, horizontal boundary conditions are set for the test piece. A distance between the upper and the lower pivot axis then defines a length of a buckling field.

In the method, the test piece can be aligned by adjusting the lower bearing segment chucks in the bearing segments of the lower clamping rail and/or by adjusting upper bearing segment chucks in the bearing segments of the upper clamping rail. This can, for example, be carried out for setting an eccentricity of the test piece, and specifically in relation to an upper bearing axis and/or in relation to a lower bearing axis, for example. As a result, for example, bending moments to be applied can be set.

The adjustment can include pretesting and readjustment, with the test piece only being lightly loaded and its alignment being assessed on the basis of a response thereto. The eccentricity or alignment relative to the pivot axes can then be set by means of the segment head chucks.

In the device, the bearing segments can be detachably connected to the clamping rails and can be removed individually. This can produce flexibility of the device in relation to a plate width. The bearing segments can each be screwed to the clamping rails. In order to allow for adaptation to the plate width during the clamping method, outermost bearing segments can be removed or additional bearing segments can be attached on the outside. In so doing, for example, a symmetrical construction is produced in relation to the clamping rails by the same number of bearing segments being added or removed on both sides. As a result, undesired uneven loading between the right and left sides of the test piece can be prevented. For example, test pieces having widths of at least 10 cm and/or at most 2 m can be clamped.

For example, in the clamped state, a test piece projects beyond the clamping edges by at least one millimeter and/or at most 10 mm, in particular e.g. approx. 5 mm, on each side.

The bearing segments can e.g. be supported by needle bearings on the upper and/or the lower clamping rail. For the bearing segments in the upper clamping rail, a bearing can be provided which supports more than half the bearing diameter. As a result, overhead work can be facilitated. For example, full-diameter-bearings or $2/3$-diameter-bearings can be used.

For the bearing segments on the lower clamping rail, the same bearings can be used. However, it is also possible to provide half needle bearings for both the upper and the lower bearings or to provide half needle bearings only for the lower bearings. When half needle bearings are used, auxiliary constructions which secure the segment heads against falling out in overhead installation can optionally be used for the upper bearings.

Two displaceable bearing blocks can be arranged on each of the upper clamping rail and/or the lower clamping rail. They can in particular be screwed to the respective clamping rail. The bearing blocks are arranged laterally beside the bearing segments and are preferably attached thereto. The bearing blocks can receive journals of bearings of outermost bearing segments and thus fix them in place. The bearing blocks can be displaced when bearing segments are added or removed.

The bearing blocks can absorb constraining forces resulting from lateral expansion of the test piece. The bearing blocks can comprise an additional shear protection device for this purpose.

For axial positioning, there can be contact surfaces between adjacent bearing segments and/or between the outermost bearing segments and the bearing block directly attached thereto.

The clamping edges can be connected to the bearing blocks. The movable bearing blocks then also make it possible to position the clamping edges in different positions on the horizontal clamping rails, and this can be useful for adapting the device to the test piece width.

The clamping edges can be movably supported on at least one of the clamping rails, preferably at least on the lower clamping rail, by a groove-pin system, in particular by a groove-pin-pad system. In particular, they can be connected to the bearing blocks of the respective clamping rails by the groove-pin system. The groove-pin system makes it possible to vertically move the clamping edge during loading by the pins running in the groove.

For example, vertical guide grooves can be provided in the bearing blocks. The groove-pin systems on the right and the left side can be configured to be asymmetrical to one another. The asymmetrical configuration can be such that it makes it possible to first insert one side while the other side is not yet engaged, and to then insert the other side. This requires fewer persons to operate the device or carry out the method.

When the groove-pin system is configured as a groove-pin-pad system, guide pads can be provided which run in the grooves. As a result, it can be ensured that the clamping rails are correctly positioned. The guide pads can be arranged on the pins.

For example, the pins can be configured as threaded rods.

A system for buckling testing is also proposed herein. Here, the system comprises the device set out here, wherein the device is mounted in a test bench, e.g. a universal test bench.

In this case, the clamping rails are clamped to machine chucks of the test bench, for example.

This system can be used in the method proposed here.

The following sequence, which can in particular specify the method set out above in greater detail, can be used to mount the device in the universal test bench:

The lower clamping rail is clamped to the lower machine chuck, while the upper clamping rail and the lower clamping rail are interconnected, in particular screwed to one another.

After this clamping in the lower machine chuck, the following steps are performed:

- lowering the upper clamping head onto the upper clamping rail,
- clamping the upper clamping rail to the upper machine chuck,
- detaching the upper clamping rail and the lower clamping rail from one another,
- raising the upper clamping head together with the upper clamping rail.

Alignment plates can be used to set the position of the interconnected or screwed-together clamping rails relative to one another.

Once the upper clamping head is raised, as described above for the method, the bearing segments and then the test piece can be inserted.

This application also provides a method for buckling testing a test piece. In this application, for example, the device set out here for clamping a test piece and/or the system for buckling testing and/or the method for clamping the test piece is used.

In the method for buckling testing, compressive stress can be applied to the test piece by means of the clamping heads. For example, pressure can be applied by lowering the upper clamping head. In particular, by doing this, buckling, e.g. core shear buckling of the test piece, can be triggered.

For example, the pressure can be applied until the test piece fails and/or the deformation of the test piece can be monitored on one or both sides by means of strain gauges, for example.

Likewise, it is possible for the test piece to be excited by cyclical compressive stress. For example, a vibration correlation technique (VCT) can be used. The excitation can be carried out as a non-destructive test. For example, the test piece can be excited by means of a shaker. Loading and/or plate displacement can be monitored by means of accelerometers, for example.

A method for testing, in particular buckling testing according to this application, allows the test piece to be rapidly swapped out.

For example, the test piece is swapped out in this method by the clamping heads being moved away from one another, for example by at least 50 mm and/or at most 60 mm, such that the pins move out of the grooves. The front clamping edges can then be removed. The test piece can, for example, first be unclamped at the top, then folded forward, and lastly unclamped at the bottom. The next test piece can then be clamped in accordance with the method.

It should be emphasized that features that are described herein only in connection with the device or the system can also be claimed for the method, and vice versa.

Figure 11:
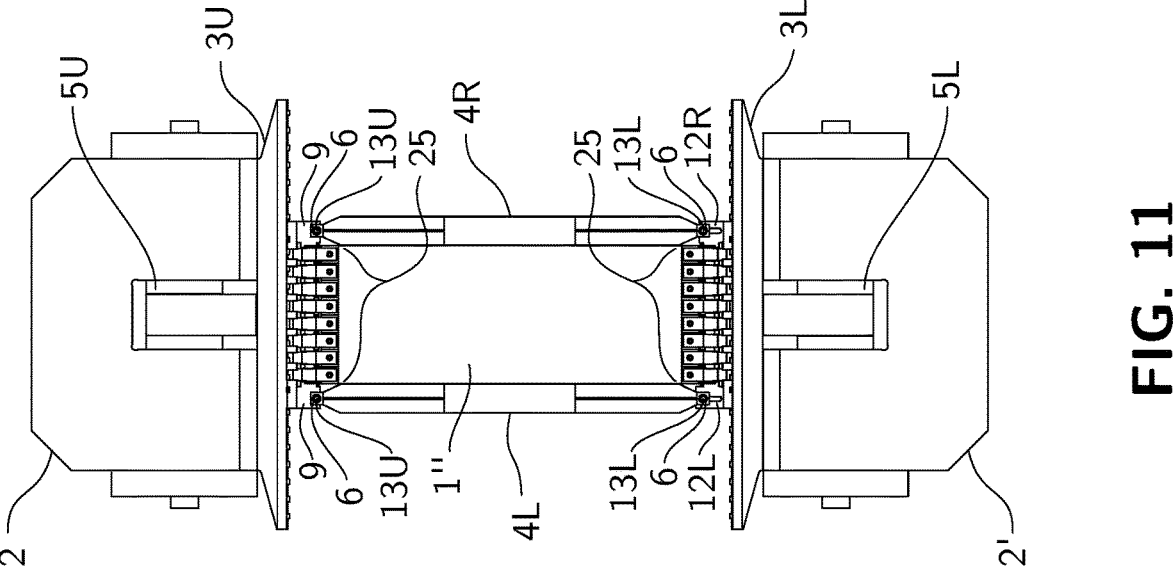
Figure 12:
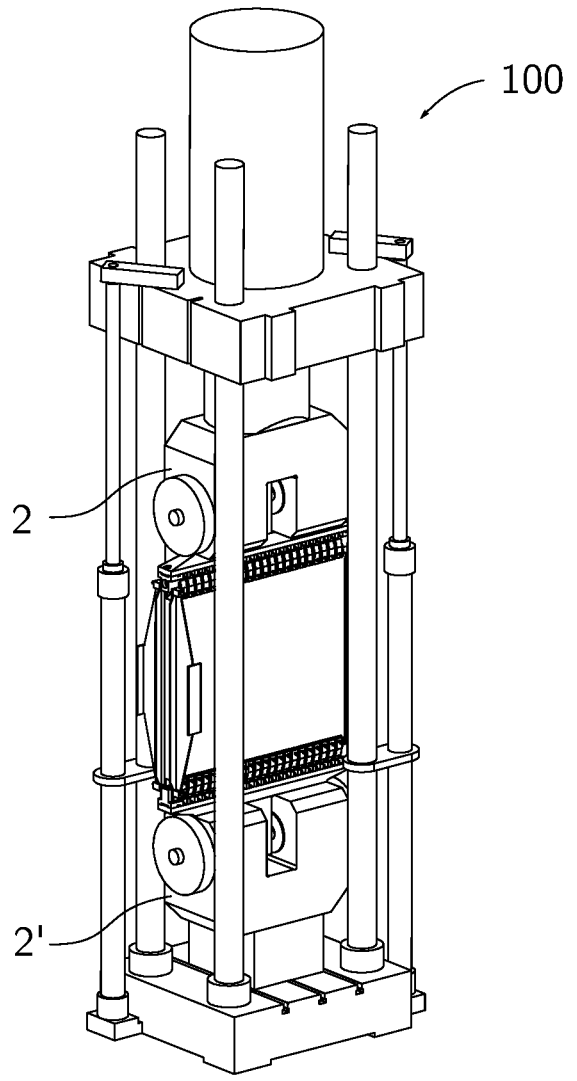

In the following, the invention will be explained in greater detail by way of example on the basis of drawings, in which:

FIG. 1 is an overview of a device for clamping a test piece, in the mounted state, FIG. 2-10 show steps of a method for mounting the device, FIG. 11 shows the device, modified for a narrow sandwich plate, and FIG. 12 shows a universal machine for receiving the device.

FIG. 1 is an overview of a device for clamping a test piece 1 in a mounted state. The test piece 1 is clamped in the device in the form of a sandwich plate, which is representative of a component of a wind turbine rotor blade. An upper clamping rail 3U and a lower clamping rail 3L of the device horizontally clamp an upper end and a lower end of the test piece 1.

Two vertical left clamping edges, namely one front left clamping edge 4L and one rear left clamping edge (concealed in the figure), and two vertical right clamping edges, namely one front right clamping edge 4R and one rear right clamping edge 4R', laterally support the test piece 1. For this purpose, a right side of the test piece is received between the two right clamping edges and a left side of the test piece 1 is received between the two left clamping edges.

A segmented bearing, in each case comprising a plurality of pivotably movable bearing segments 26, which can be individually pivoted out of a clamping plane, is arranged on each of the upper clamping rail 3U and the lower clamping rail 3L, and therefore corresponding deformations of the test piece can be permitted. The bearing segments 26 each comprise a bearing segment chuck.

This will be explained later in greater detail on the basis of FIG. 7-9, for example.

The upper clamping rail 3U is connected to an upper clamping head 2 of a test bench and the lower clamping rail 3L is connected to a lower clamping head 2' of the test bench.

If the test piece 1 is supposed to be clamped as shown here, for example in order to carry out a buckling test, the lower clamping rail 3L is first clamped to a lower machine chuck 5L (see following figures) of the lower clamping head 2'. Later, the upper clamping rail is clamped to an upper machine chuck 5U (see following figures) of the upper clamping head 2. The bearing segments 26 are then attached to the two clamping rails.

When this is done, the two rear lateral clamping edges 4L', 4R' are first fastened to the upper clamping rail 3U.

The test piece 1 can then be inserted into the lower bearing segments and clamped to the lower bearing segment chucks. For this purpose, the bearings can first be folded forward so that the test piece 1 can be inserted flat from the front. After clamping the test piece 1 to the lower bearing segment chucks, it is connected to the lower clamping rail and can be folded upward. The raised test piece can be supported from the rear by the two rear clamping edges 4L', 4R'.

The two front lateral clamping edges 4L, 4R can then be positioned in front of the test piece 1 and fastened to the upper clamping rail 3U. The test piece 1 then sits between the front and the rear clamping edges.

The upper clamping head together with the upper clamping rail 3U arranged thereon is then lowered onto the test piece, a groove-pin system being inserted for movably fastening all the clamping edges 4L, 4L', 4R, 4R' to the lower clamping rail 3L. The groove-pin system and the fastening of the clamping edges to the clamping rails will be explained later in greater detail, for example in connection with FIGS. 5 and 6.

Mounting of the device will be explained on the basis of FIGS. 2 to 10. In doing so, it will be explained how the clamping device itself can be mounted and also how the test piece 1 can then be mounted therein.

Figure 2:
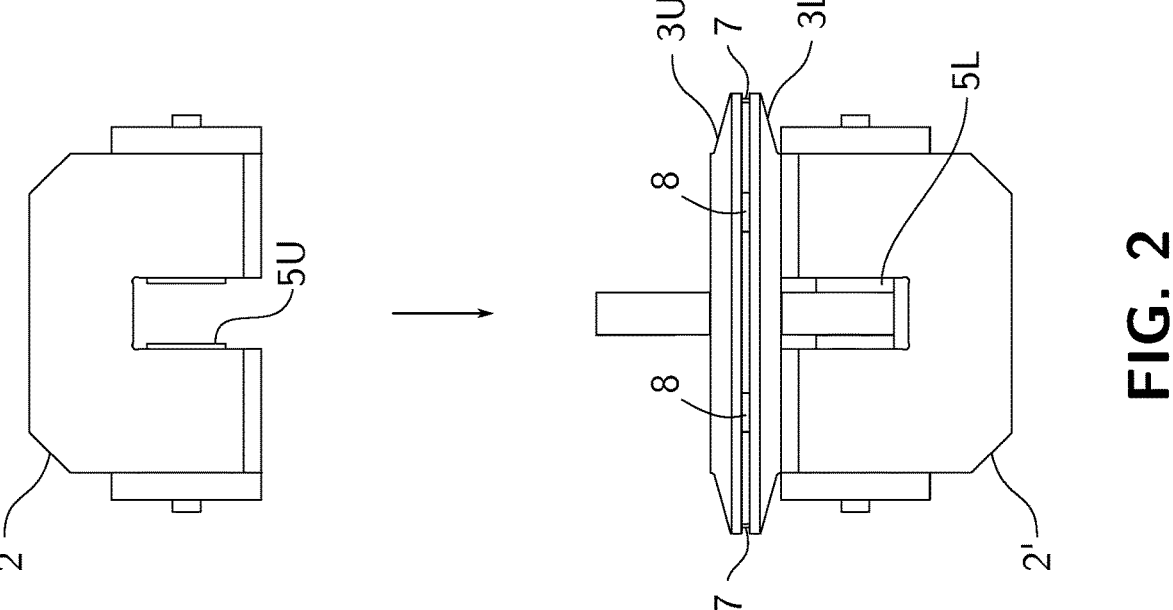

FIG. 2 shows a mounting step in a front view in which the upper clamping rail 3U and the lower clamping rail 3L are screwed to one another by means of alignment screws 7. In order to ensure that the two clamping rails are correctly positioned relative to one another, alignment plates 8 are also arranged between the clamping rails 3U, 3L. These alignment plates are removed later, after disconnecting the clamping rails from one another. The thus interconnected clamping rails can be inserted into a test bench, with these first being placed onto the lower clamping head 2', as shown in FIG. 2. The lower clamping rail 3L is then clamped to the machine chuck 5L.

Figure 3:
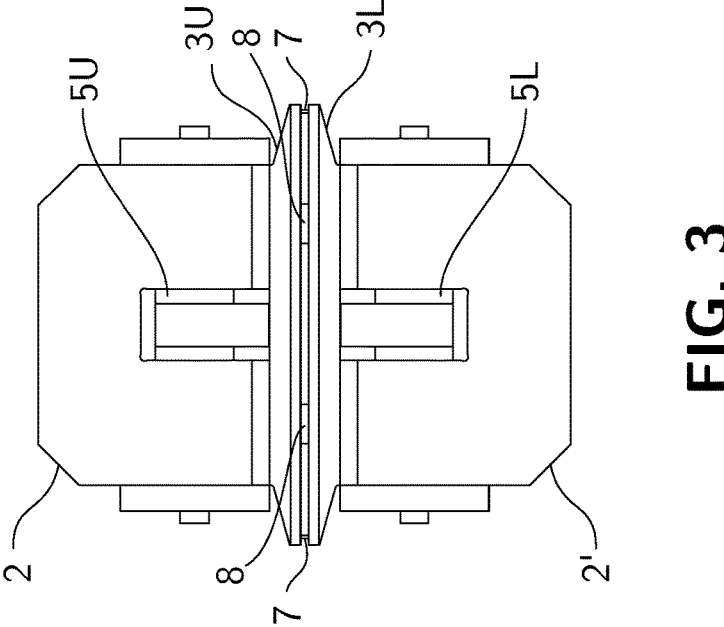

FIG. 3 is a front view of a mounting step which is performed after the mounting step from FIG. 2. In this step, the upper clamping head 2 is lowered onto the upper clamping rail 3U. The lower clamping rail 3U is then clamped to the upper machine chuck 5U.

The upper and the lower clamping rail can then be detached from one another by detaching the alignment screws 7.

Figure 4:
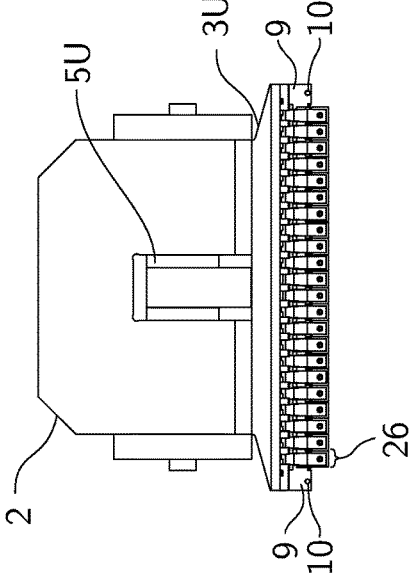
Figure 4:
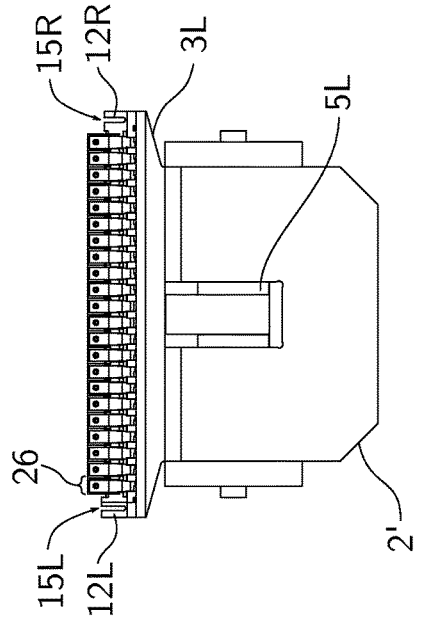

FIG. 4 shows a mounting step in the front view which is performed after the mounting step from FIG. 3. In this step, the upper clamping head 2 is raised together with the upper clamping rail once the clamping rails are detached from one another. The alignment plates 8 are then removed.

The bearing segments 26 are then arranged on the clamping rails. The bearing segments 26 are screwed to the clamping rails.

In this case, the number of bearing segments 26 is determined by a width of the test piece 1, the test piece being intended to project laterally beyond the bearing segments 26 in order to allow it to be clamped between the clamping edges.

The bearing segments 26 are arranged symmetrically with respect to the clamping rails 3U, 3L and the clamping heads 2, 2' so as to later bring about even load application.

Upper bearing blocks 9 are then screwed to the upper clamping rail 3U beside the bearing segments 26, one to the right and one to the left of the bearing segments 26. These bearing blocks receive journals of the bearing segments 26 and thus additionally fix them in place (see e.g. also FIG. 6).

Figure 5:
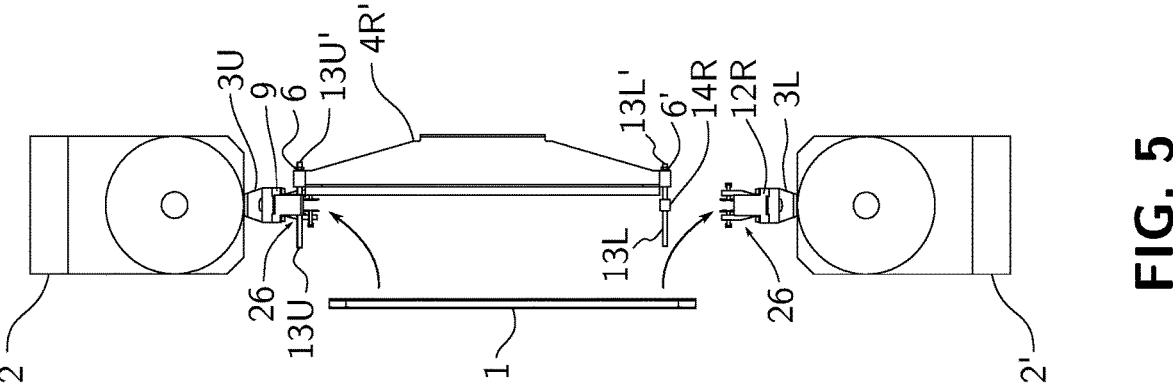

Moreover, the upper bearing blocks 9 comprise threaded holes 10 for fastening the clamping edges 4L, 4L', 4R, 4R' (cf. FIG. 5).

A left lower bearing block 12L and right lower bearing block 12R are screwed to the right and the left of the bearing segments 26 on the lower clamping rail 3L. These lower bearing blocks 12L, 12R likewise receive journals of the bearing segments and thus support them. Furthermore, the lower bearing blocks 12L, 12R each comprise a groove 15L, 15R for connection to the clamping edges 4L, 4L', 4R, 4R'.

FIG. 5 shows a mounting step in a side view or a state of the device in which the test piece can be inserted or swapped out: a front threaded pin 13U in the upper bearing block and a rear threaded pin 13U' in the upper bearing block are screwed toward one another in the threaded hole 10. FIG. 5 shows the right side of the device; these steps are also carried out on the left side.

The left rear clamping edge 4L' and the right rear clamping edge 4R' are pushed onto the rear threaded pin in the upper bearing block 13U' and are secured by a nut 6. All the clamping edges are therefore non-movably supported at the top by being connected to the threaded pins 13U, 13U' in the upper bearing block 9.

At lower ends of the clamping edges, a front threaded pin 13L and a rear threaded pin 13L' are screwed toward one another in a right guide pad 14R. The rear threaded pin 13L' is held in the clamping edge 4R' by a nut 6'. These steps are also carried out on the left.

The test piece 1 in the form of a sandwich plate is, as described above, first inserted along the lower bearing segments 26 and is then connected to the upper bearing segments 26.

The front clamping edges 4L, 4R can then be mounted in front of the test piece 1, such that a gap remains between the clamping edges 4L, 4L', 4R, 4R' and the test piece 1.

The upper clamping head 2 is lowered until the upper and lower sandwich plate edges rest in segment heads.

Figure 6:
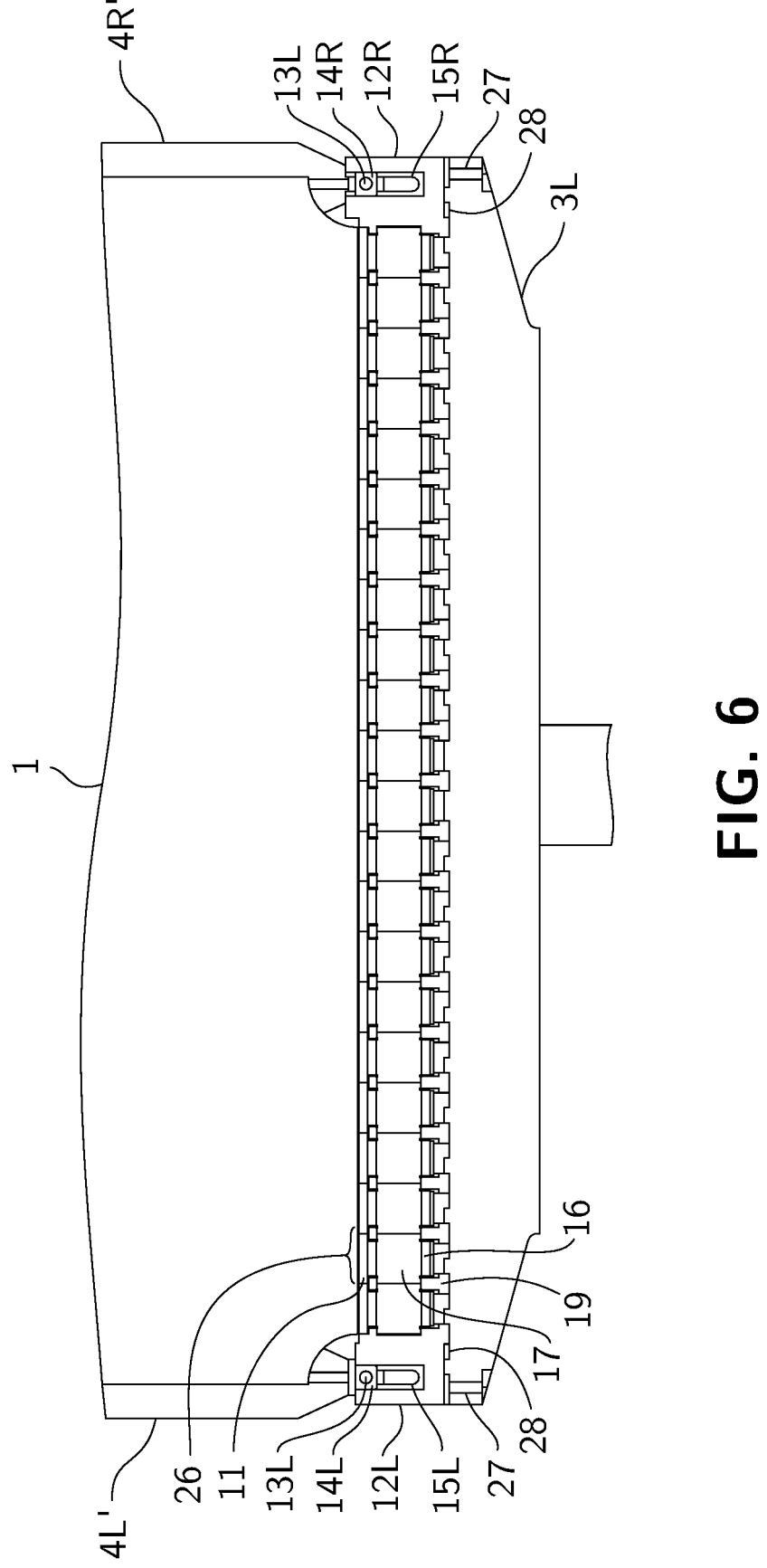

FIG. 6 shows a mounting step in a sectional view through the sandwich plate plane of the lower clamping rail 3L. The left guide pad 14L is arranged to be higher than the right guide pad 14R. Owing to the asymmetrical configuration, connection to the clamping edges is simplified, since the groove-pin system can first be inserted on the right side and then on the left side, such that, during the lowering, two persons are not necessarily required to insert the two pads into the groove simultaneously. Alternatively or additionally, for this purpose the grooves can also be configured to be asymmetrical and, for example, the right bearing block 12R can be configured to be higher than the left bearing block 12L.

The guide pad 14R arranged between the threaded pins 13L, 13L' thus runs in the groove and ensures that the threaded pins 13L, 13L' move vertically up and down without any undesired movement forward or backward. The clamping edges 4R, 4R' are movably supported at the bottom in this way.

FIG. 6 also shows the journals of the bearing segments 26, these being journals of full needle bearings, the segment heads 11 of which are also shown. The journals of the outermost bearing segments are received by the bearing blocks 12L, 12R. Each bearing segment 12 is supported between two journal holders 19 by a full needle bearing 16 on a journal. The full needle bearings 16 and journals 17 are also shown in FIGS. 7 and 8. The furthest right bearing segment 26 is fixed in the right bearing block 12R by its journal 17. Each bearing block 12L, 12R has a shear protection device 28 for carrying away shear forces.

Figure 8:
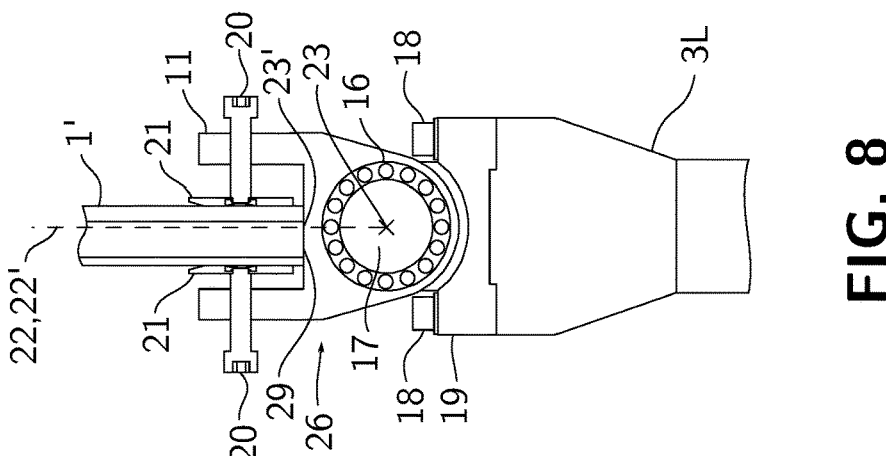
Figure 7:
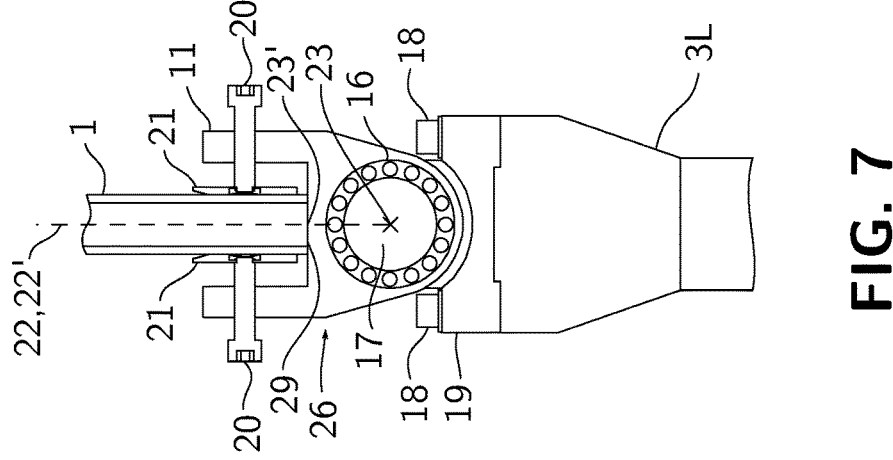

FIGS. 7 and 8 in particular show the bearing segments 26 and their bearing segment chucks in a greater level of detail. These figures show different test pieces; namely, the sandwich plate from the preceding explanations is shown in FIG. 7 and an asymmetrical sandwich plate is shown in FIG. 8.

The bearing segments 26 are each screwed to the lower clamping rail 3L by means of screws 18. The bearing segments 26 comprise the segment chuck, which in turn is formed by segment clamping heads 11, clamping screws 20, and clamping plates 21. The clamping screws 20 are tightened manually without any clearance in order to contact the test piece with a form fit, but without exerting pressure caused by the tightening on the front face and rear face of the plate.

A low-friction layer, for example made of polytetrafluorethylene, polyoxymethylene, or an alloy, is arranged at contact surfaces 29 at which the bearing segments 26 contact the test piece and at which, for example, compressive stress is applied to the test piece, in particular over the test piece edge 23', in order to reduce a coefficient of friction to $\mu$=0.05 on the side of the test piece. This can make it possible for the test piece to become wider during the test, for example, without being prevented from doing so by the bearing segment, such that a test result is not distorted. The contact surface of the lower bearing segments 26, which contact the lower sandwich plate edge 23', is shown. For the upper bearing segments 26, the same applies to the contact surfaces thereof that contact an upper sandwich plate edge.

In FIGS. 7 and 8, the test pieces are each inserted into the segment heads 11 and are clamped by means of the clamping heads 20 and clamping plates 21, the clamping heads 20 and clamping plates 21 allowing for adaptation to the test piece thickness. The bearing segment chucks are therefore configured to receive test pieces having different thicknesses or having spatially varying thicknesses along the edge.

The plates shown have a thickness of 20 mm, with plates having thicknesses between 1 mm and 55 mm being able to be received.

In addition to being adapted to thickness, the bearing segment chucks are also suitable for performing alignment of the test piece relative to a pivot axis of the bearing segments 26: the bearings of the bearing segments 26 are configured as full needle bearings 16. They comprise journals 17 and journal holders 19. The pivot axis extending through the needle bearing center point 23 is defined by the journals 17. An alignment of the test piece 1, 1' relative to the pivot axis has an effect on the force applied to the test piece during the test. The test piece, as shown in FIG. 7, can thus be clamped without any eccentricity. Here, a center of gravity line 22 of the test piece and an action line 22' of force application and absorption then extends through the needle bearing center point 23. A bending moment is then not applied to the test piece when moving the clamping rails 3U, 3L toward one another, for example.

It is thus possible to set the eccentricity by the bearing segment chucks, and therefore the force application and, for example, a bending moment can be set.

FIG. 8 illustrates this again using the example of a test piece 1' configured as an asymmetrical sandwich plate. This has eccentricity at the point of the section. The eccentricity can be influenced by the bearing segment chuck by the opposing clamping screws 20 being adjusted in this plane to set the eccentricity and e.g. by the test piece being moved further to the right or left. In the example shown, the eccentricity is set such that the center of gravity line 22 and the action line 22' lie on top of one another. In this example, however, for this purpose they do not extend through the needle bearing center point 23; therefore, there is non-vanishing eccentricity in the sectional plane.

The test piece 1, 1' can therefore be aligned by adjusting the lower bearing segment chucks in the bearing segments 26 of the lower clamping rail 3L and by adjusting upper bearing segment chucks in the bearing segments 26 of the upper clamping rail 3U, and the eccentricity of the test piece 1, 1' can be set in relation to the lower bearing axis defined by the bearing segments 26 of the lower clamping rail 3L, and in relation to the upper bearing axis defined by the bearing segments 26 of the upper clamping rail 3U.

Figure 9:
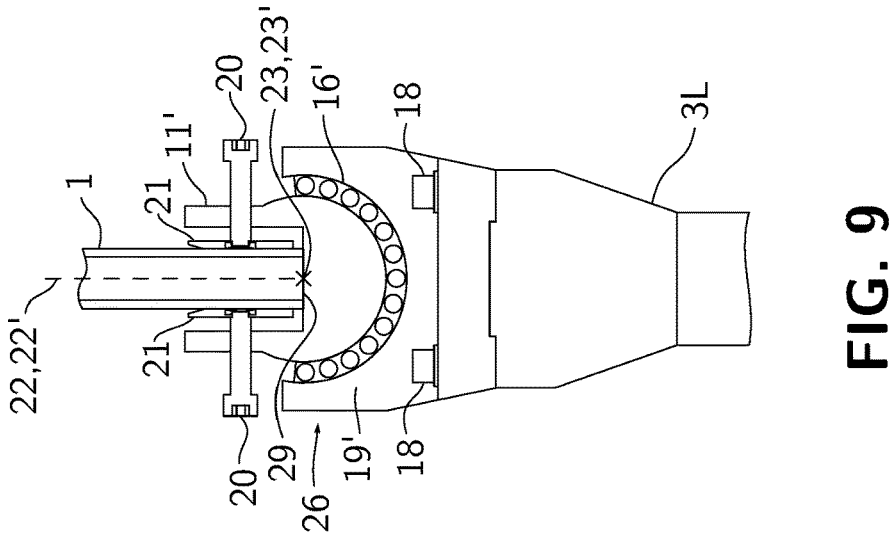

The bearing segments 26 are configured on the upper clamping rail 3U in the same way as on the lower clamping rail 3L shown in FIG. 7-9.

FIG. 9 shows a variant for a bearing segment 26 comprising a half needle bearing 16' and a symmetrical sandwich plate. The needle bearing center point 23 is on the lower sandwich plate edge 23'.

If half needle bearings are also used on the upper clamping rail, during the mounting process support structures can be used to fix the half needle bearings in place until the test piece is inserted.

Figure 10:
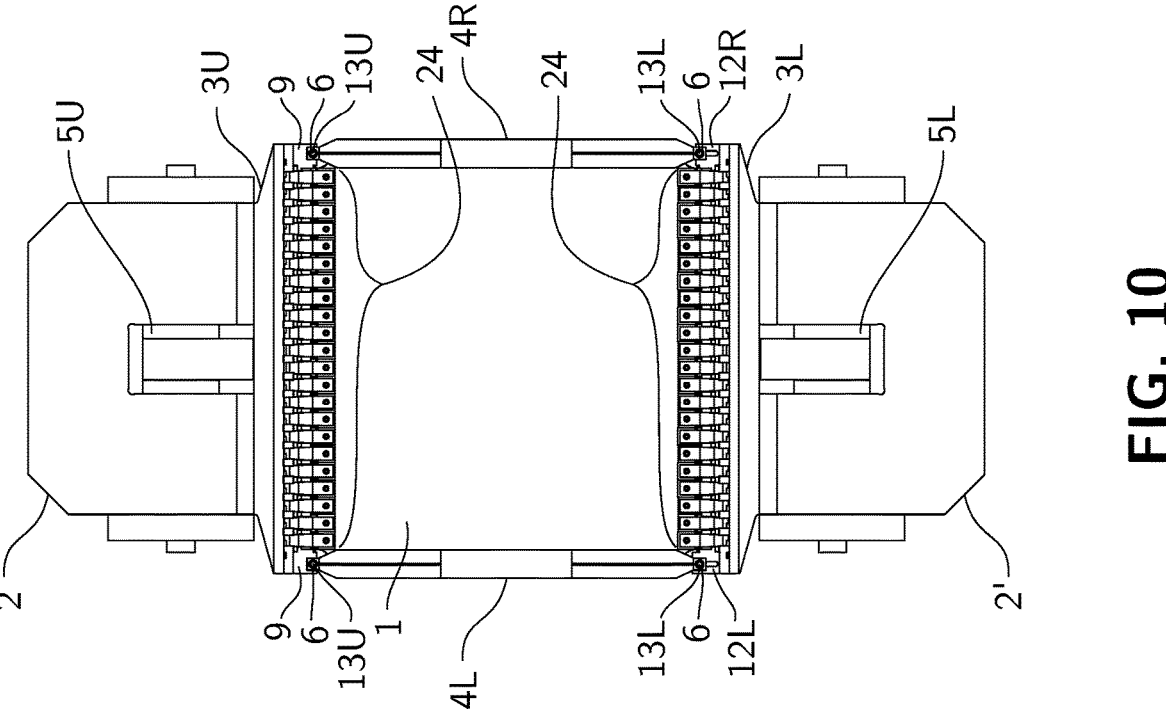

FIGS. 10 and 11 are front views of the device which illustrate an adaptation to a plate width. FIG. 10 shows a square plate having dimensions of 1.2 m×1.2 m.

By contrast, FIG. 11 shows a variant of the device for a narrow sandwich plate 1". In this case, starting from the configuration from FIG. 10, the front clamping edges 4L and 4R can be detached from the threaded pins 12U and 13L. The upper bearing blocks 9 and the lower bearing blocks 12L and 12R are then detached and some bearing segments 26 are dismounted in order to adapt a clamping length of the horizontal clamping provided by the bearing segments 26 to the test piece width. The bearing blocks 9, 12L, 12R are detached symmetrically in this case. The bearing blocks 9, 12L, 12R can be offset along the upper and the lower clamping rail 3U, 3L in an increment corresponding to a width of a bearing segment 26. An adaptation to a desired sandwich plate width can be made such that the clamped test piece 1, 1" projects beyond the clamping edges by 5 mm on each side.

When the bearing segments 26 have been completely configured for the width of the test piece 1" and the bearing blocks 9, 12L, 12R have been screwed to the clamping rails 3U, 3L again, the test piece 1" is inserted and the clamping edges 4L, 4R are each pushed onto the threaded pins 13U and 13L so as to be flush with the test piece 1" or with a small gap therefrom and are secured by a nut 6.

FIG. 12 shows an overview of a universal test bench. It comprises the upper clamping head 2' and the lower clamping head 2. For the buckling testing, the above-described device is mounted in the universal test bench by the clamping rails 3U, 3L being clamped to the machine chucks 5U, 5L of the clamping heads 2, 2'.

During the buckling testing, compressive stress can be applied to the test piece 1, 1', 1" by lowering the upper clamping head 2 until the test piece 1, 1', 1" fails. Cyclical stress can also be applied.

LIST OF REFERENCE SIGNS

1, 1', 1" test piece
2 upper clamping head
2 lower clamping head
3U upper clamping rail
3L lower clamping rail
4L left front clamping edge 4L' left rear clamping edge
4R right front clamping edge
4R' right rear clamping edge
5U upper machine chuck
5L lower machine chuck
6 nut
7 alignment screw
8 alignment plate
9 upper bearing block
10 threaded hole
11 segment head for full needle bearing
11' segment head for half needle bearing
12L left lower bearing block
12R right lower bearing block
13U front threaded pin in the upper bearing block
13U' rear threaded pin in the upper bearing block
13L front threaded pin in the lower bearing block
13L' rear threaded pin in the lower bearing block
14R right guide pad
14L left guide pad
15L groove in the left lower bearing block
15R groove in the right lower bearing block
16 full needle bearing
16' half needle bearing
17 journal
18 screw for bearing segment
18' screw for bearing block
19 journal holder
20 clamping screw
21 clamping plate
22 center of gravity line
22' action line of force application and absorption
23 needle bearing center point
23' lower sandwich plate edge
24 arrangement of the bearing segments for a wide
    sandwich plate
25 arrangement of the bearing segments for a narrow
    sandwich plate
26 bearing segment
27 alignment hole
28 shear protection device
29 contact surface
100 universal test machine

The invention claimed is:

1. A device for clamping a test piece, comprising:
an upper clamping rail and a lower clamping rail for
    horizontally clamping an upper end and a lower end of
    the test piece;
vertical left clamping edges and vertical right clamping
    edges for laterally supporting a right side and a left side
    of the test piece;
wherein
a segmented bearing is arranged on each of the upper
    clamping rail and the lower clamping rail, each seg-
    mented bearing comprising a plurality of pivotably
    movable bearing segments which can be individually
    pivoted out of a clamping plane;
and wherein
the bearing segments each comprise a bearing segment
    chuck.

2. The device for clamping a test piece according to claim
1, wherein the bearing segments are detachably connected to
the clamping rails and can be removed individually.

3. The device for clamping a test piece according to claim
1, wherein the bearing segment chucks are configured to
receive test pieces having different thicknesses or spatially varying thicknesses and/or to perform alignment of the test
piece relative to a pivot axis of the bearing segments.

4. The device for clamping a test piece according to claim
1, wherein the bearing segment chucks are configured to
receive test pieces having a thickness of 1 mm or more.

5. The device for clamping a test piece according to claim
1, wherein the bearing segment chucks are configured to
receive test pieces having a thickness of 1 mm or more.

6. The device for clamping a test piece according to claim
1, wherein the bearing segment chucks are configured to
receive test pieces having a thickness of 20 mm or more.

7. The device for clamping a test piece according to claim
1, wherein the bearing segment chucks are configured to
receive test pieces having a thickness of 100 mm or less.

8. The device for clamping a test piece according to claim
1, wherein the bearing segment chucks are configured to
receive test pieces having a thickness of 60 mm or less.

9. The device for clamping a test piece according to claim
1, wherein the bearing segment chucks are configured to
receive test pieces having a thickness of 60 mm or less.

10. The device for clamping a test piece according to
claim 1, wherein the bearing segment chucks comprise
clamping screws and clamping plates, with a pair of oppos-
ing clamping screws arranged in each bearing segment.

11. The device for clamping a test piece according to
claim 1, wherein contact surfaces of the bearing segments,
which are configured to contact a test piece edge, have a
coating for reducing a coefficient of friction, wherein the
coating includes polytetrafluorethylene, polyoxymethylene,
or an alloy thereof.

12. The device for clamping a test piece according to
claim 1, wherein the bearing segments are supported on the
upper and the lower clamping rail by needle bearings,
wherein at least the needle bearings for the bearing segments
in the upper clamping rail comprise a bearing which sup-
ports more than half the bearing diameter.

13. The device for clamping a test piece according to
claim 1, wherein two relocatable bearing blocks are arranged
on each of the upper clamping rail and the lower clamping
rail, wherein the bearing blocks receive journals of bearings
of outermost bearing segments and/or wherein the clamping
edges are connected to the bearing blocks at the top and the
bottom.

14. The device for clamping a test piece according to
claim 1, wherein the clamping edges are movably supported
on the lower clamping rail by a groove-pin system.

15. The device for clamping a test piece according to
claim 14, wherein the clamping edges are movably sup-
ported on lower bearing blocks.

16. A system for buckling testing of a test piece, com-
prising:
a test bench;
an upper clamping rail and a lower clamping rail for
    horizontally clamping an upper end and a lower end of
    the test piece mounted on the test bench;
vertical left clamping edges and vertical right clamping
    edges for laterally supporting a right side and a left side
    of the test piece;
wherein
a segmented bearing is arranged on each of the upper
    clamping rail and the lower clamping rail, each seg-
    mented bearing comprising a plurality of pivotably
    movable bearing segments which can be individually
    pivoted out of a clamping plane;
and wherein
the bearing segments each comprise a bearing segment
    chuck.

17. A method for clamping a test piece for a buckling test, comprising:

clamping a lower clamping rail to a lower machine chuck of a lower clamping head of a test bench;

clamping an upper clamping rail to an upper machine chuck of an upper clamping head of the test bench;

fastening bearing segments to the upper clamping rail and the lower clamping rail, wherein the bearing segments can be individually pivoted out of a clamping plane;

fastening rear lateral clamping edges to the upper clamping rail;

inserting the test piece and clamping the test piece in the bearing segments of the lower clamping rail by means of lower bearing segment chucks;

fastening front lateral clamping edges to the upper clamping rail such that the test piece is arranged between the front and the rear clamping edges; and lowering the upper clamping head and inserting a groove-pin system for movably fastening the clamping edges to the lower clamping rail.

18. The method for clamping a test piece according to claim 17, further comprising:

aligning the test piece by adjusting the lower bearing segment chucks in the bearing segments of the lower clamping rail and/or by adjusting upper bearing segment chucks in the bearing segments of the upper clamping rail, wherein aligning the test piece sets an eccentricity of the test piece in relation to a lower bearing axis defined by the bearing segments of the lower clamping rail, and/or in relation to an upper bearing axis defined by the bearing segments of the upper clamping rail.

19. The method for clamping a test piece according to claim 17, further comprising:

screwing the upper clamping rail and the lower clamping rail to one another while the lower clamping rail is clamped to the lower machine chuck by means of alignment screws;

lowering the upper clamping head onto the upper clamping rail;

clamping the upper clamping rail to the upper machine chuck;

detaching the upper clamping rail and the lower clamping rail from one another by detaching the alignment screws; and raising the upper clamping head together with the upper clamping rail.

20. The method for clamping a test piece according to claim 17, further comprising:

applying compressive stress to the test piece by lowering the upper clamping head until the test piece fails, or the test piece is excited by cyclical compressive stress.

* * * * *